US006648710B2

(12) United States Patent
Milligan et al.

(10) Patent No.: US 6,648,710 B2
(45) Date of Patent: Nov. 18, 2003

(54) METHOD FOR LOW-TEMPERATURE SHARPENING OF SILICON-BASED FIELD EMITTER TIPS

(75) Inventors: Donald J. Milligan, Corvallis, OR (US); John Stephen Dunfield, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 212 days.

(21) Appl. No.: 09/880,160

(22) Filed: Jun. 12, 2001

(65) Prior Publication Data

US 2002/0187714 A1 Dec. 12, 2002

(51) Int. Cl.[7] .................................................. H01G 9/04

(52) U.S. Cl. ............................. 445/50; 445/24; 445/41; 445/43; 445/26; 313/309; 313/310

(58) Field of Search .............................. 445/50, 24, 25, 445/41, 43, 23, 26; 313/308, 495, 309, 310; 438/20, 700

(56) References Cited

U.S. PATENT DOCUMENTS

| | | | | |
|---|---|---|---|---|
| 3,811,002 A | * | 5/1974 | Garbe et al. | |
| 5,090,932 A | | 2/1992 | Dieumegard et al. | 445/24 |
| 5,458,518 A | * | 10/1995 | Lee | |
| 5,557,596 A | | 9/1996 | Gibson et al. | 369/101 |
| 5,857,885 A | * | 1/1999 | Laou et al. | |
| 6,008,576 A | | 12/1999 | Nakatani et al. | 313/495 |
| 6,010,918 A | * | 1/2000 | Marino et al. | |
| 6,057,172 A | | 5/2000 | Tomihari | |
| 6,074,264 A | * | 6/2000 | Hattori | |
| 6,096,570 A | | 8/2000 | Hattori | 438/20 |
| 6,137,212 A | | 10/2000 | Liu et al. | 313/308 |
| 6,139,760 A | * | 10/2000 | Shim et al. | |
| 6,417,016 B1 | * | 7/2002 | Gilton et al. | |
| 6,448,100 B1 | * | 9/2002 | Schulte et al. | |

FOREIGN PATENT DOCUMENTS

| | | |
|---|---|---|
| EP | 0379298 | 7/1990 |
| EP | 0731490 | 9/1996 |
| WO | WO99/62106 | 12/1999 |

OTHER PUBLICATIONS

"Fabrication Of Sub–10 nm Silicon Tips: A New Approach"; by: Huq, et al; XP 000558344; Journal Of Vacuum Science And Technology; B 13(6); Nov./Dec. 1995; pp: 2718–2721.

"Procedes de Fabrication De Micropointes En Silicium"; by: Moreau, et al; Sciences Et Techniques; XP000637302; 1996; No. 282; vol. 52; ISSN: 1266–0167; pp. 463–477.

* cited by examiner

*Primary Examiner*—Dean A. Reichard
*Assistant Examiner*—Nguyen T. Ha

(57) ABSTRACT

A low temperature process for silicon-based field emitter tip sharpening. A rough silicon-based field emitter tip is exposed to xenon difluoride gas in a process chamber to carry out low-temperature, isotropic etching of the rough silicon-based field emitter tip to produce a final, sharpened field emitter tip.

14 Claims, 4 Drawing Sheets

METHOD FOR LOW-TEMPERATURE SHARPENING OF SILICON-BASED FIELD EMITTER TIPS

TECHNICAL FIELD

The present invention relates to silicon-based field emitter tips and, in particular, to a method for sharpening silicon-based field emitter tips at low temperatures.

BACKGROUND OF THE INVENTION

The present invention relates to design and manufacture of field emitter tips, including silicon-based field emitter tips. A brief discussion of field emission and the principles of design and operation of field emitter tips is therefore first provided in the following paragraphs, with reference to FIG. 1.

When a wire, filament, or rod of a metallic or semiconductor material is heated, electrons of the material may gain sufficient thermal energy to escape from the material into a vacuum surrounding the material. The electrons acquire sufficient thermal energy to overcome a potential energy barrier that physically constrains the electrons to quantum states localized within the material. The potential energy barrier that constrains electrons to a material can be significantly reduced by applying an electric field to the material. When the applied electric field is relatively strong, electrons may escape from the material by quantum mechanical tunneling through a lowered potential energy barrier. The greater the magnitude of the electrical field applied to the wire, filament, or rod, the greater the current density of emitted electrons perpendicular to the wire, filament, or rod. The magnitude of the electrical field is inversely related to the radius of curvature of the wire, filament, or rod.

FIG. 1 illustrates principles of design and operation of a silicon-based field emitter tip. The field emitter tip 102 rises to a very sharp point 104 from a silicon-substrate cathode 106, or electron source. A localized electric field is applied in the vicinity of the tip by a first anode 108, or electron sink, having a disk-shaped aperture 110 above and around the point 104 of the field emitter tip 102. A second cathode layer 112 is located above the first anode 108, also with a disk-shaped aperture 114 aligned directly above the disk-shaped aperture 110 of the first anode layer 108. This second cathode layer 112 acts as a lens, applying a repulsive electronic field to focus the emitted electrons into a narrow beam. The emitted electrons are accelerated towards a target anode 118 impacting in a small region 120 of the target anode defined by the direction and width of the emitted electron beam 116. Although FIG. 1 illustrates a single field emitter tip, silicon-based field emitter tips are commonly micro-manufactured by microchip fabrication techniques as regular arrays, or grids, of field emitter tips.

Silicon-based field emitter tips are commonly located on the surface of complementary metal-oxide semiconductor ("CMOS") wafers. As discussed above, the current density of emitted electrons from a field emitter tips greatly increases with a decrease in the radius of the tip. Therefore, since it is desirable to achieve high current densities from silicon-based field emitter tips, tip sharpening procedures are normally employed in the final stage or stages of silicon-based field emitter tip array manufacture. FIGS. 2A–C illustrate a currently-available tip-sharpening procedure. In FIG. 2A, a blunt silicon-based field emitter tip 202 rises from a flat silicon substrate 204. In order to sharpen the tip, a thin surface layer of the field emitter tip and silicon substrate is heated to thermally oxidize silicon to $SiO_2$. FIG. 2B shows the field emitter tip shown in FIG. 2A following thermal oxidation. The thin $SIO_2$ layer 206 is grown inward from the surface of the field emitter tip and silicon substrate to produce a sharp, silicon-based field emitter tip 208 embedded within the thin $SiO_2$ coating 206. Finally, the thin S102 layer is removed by hydrofluoric acid, HF, wet etching. FIG. 2C shows the final sharp field emitter tip following HF wet etching. The point 210 of the final sharp field emitter tip may have a breadth of between 10 and several hundred Angstroms.

Thermal-oxide-based tip sharpening is effective and is commonly employed in current silicon-based field emitter tip application methodologies. However, especially when used to sharpen silicon-based field emitter tips fabricated on the surface of CMOS wafers, the thermal oxidation tip sharpening process has clear deficiencies due to the relatively high temperatures, commonly greater than 900 C, necessary to grow the surface layer of $SiO_2$. A first deficiency is that the underlying CMOS circuitry may employ low-melting-point conductors that can be degraded by high temperature exposure. Thus, extremely precise application of heat must be carried out to grow the surface layer of $SIO_2$ while not adversely effecting underlying CMOS circuitry. Often, to increase physical stability of silicon-based field emitter tips, a thin, metallic layer is deposited on the silicon surface of the field emitter tip. A second deficiency of thermal-oxide-based tip sharpening is that, once the metal is deposited, high-temperature sharpening processes can no longer be employed without melting or vaporizing the deposited metal. For these reasons, designers and manufacturers of silicon-based field emitter tips have recognized the need for an economical, low-temperature process for sharpening silicon-based field emitter tips.

SUMMARY OF THE INVENTION

One embodiment of the present invention provides an efficient and economical process for sharpening silicon-based field emitter tips at low temperatures. A rough field emitter tip is carved out from a silicon well below a photoresist mask by isotropic plasma etching. The photoresist mask is removed, and the rough silicon-based field emitter tip that results is sharpened by isotropic xenon difluoride, $XeF_2$ etching.

DETAILED DESCRIPTION OF THE INVENTION

Figure 1:
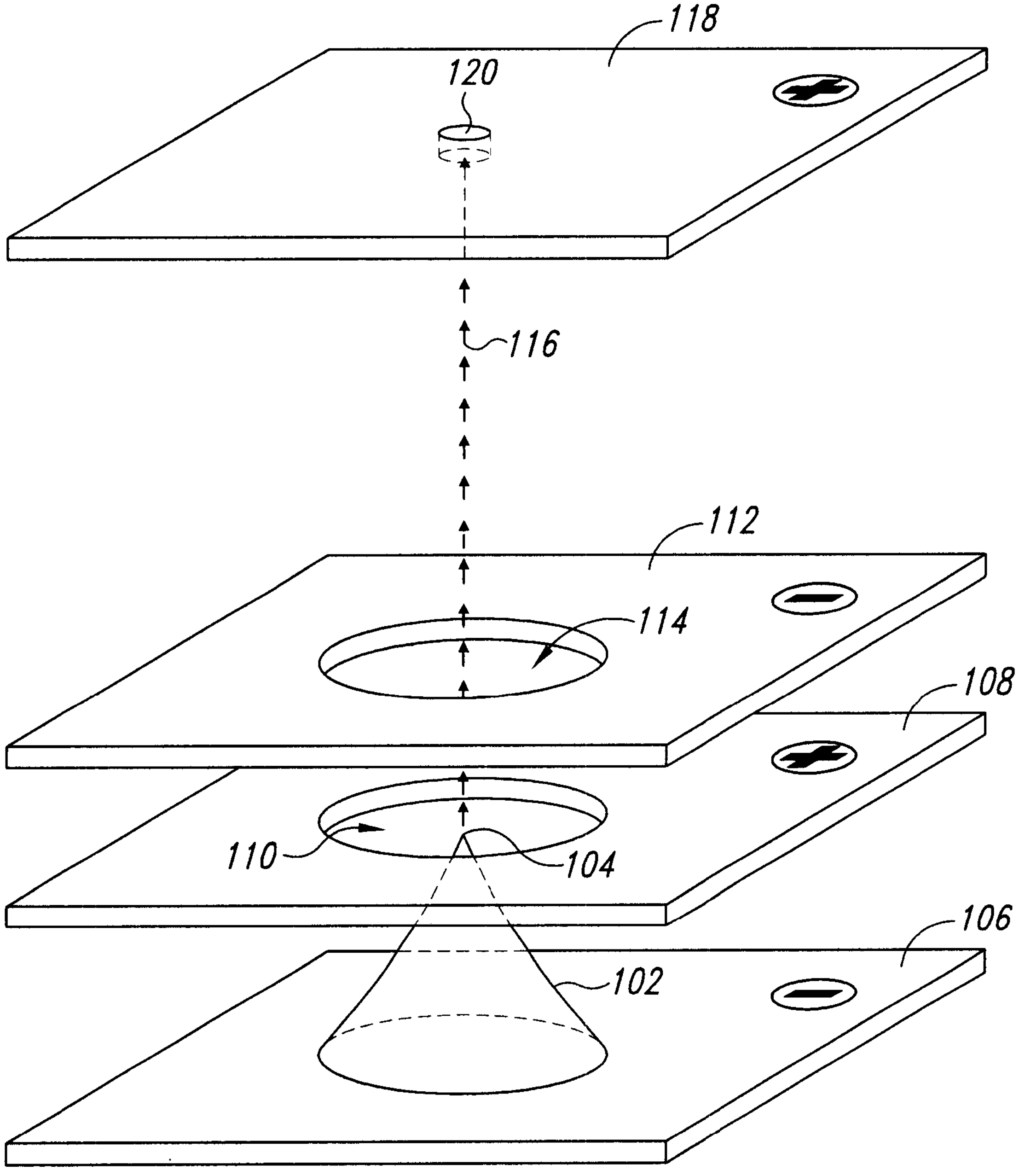
FIG. 1 illustrates principles of design and operation of a silicon-based field emitter tip.
Figure 2A:
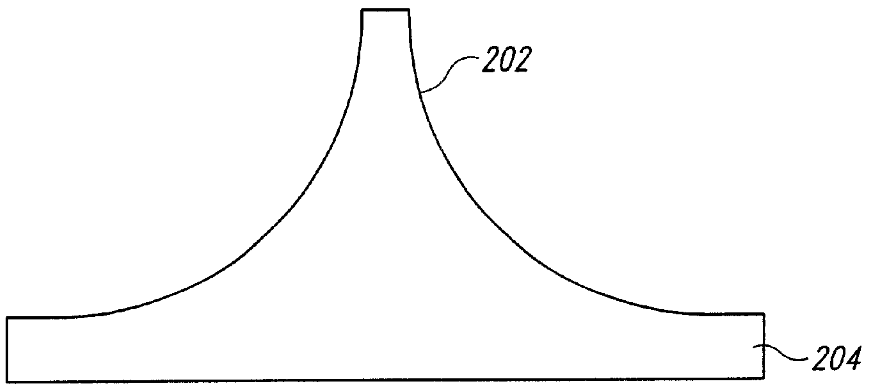
FIGS. 2A–C illustrate a currently available tip-sharpening procedure.
Figure 2B:
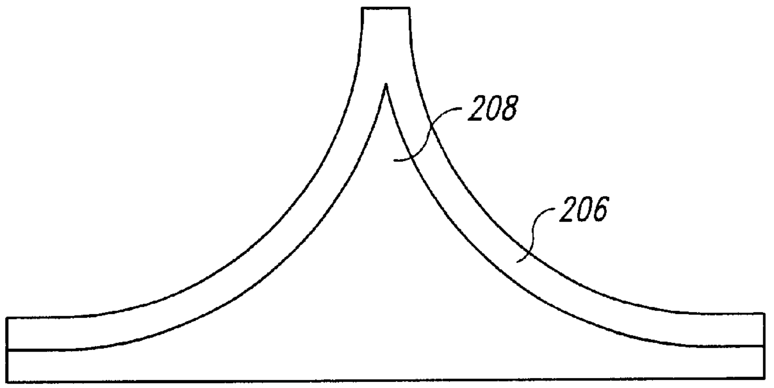
Figure 2C:
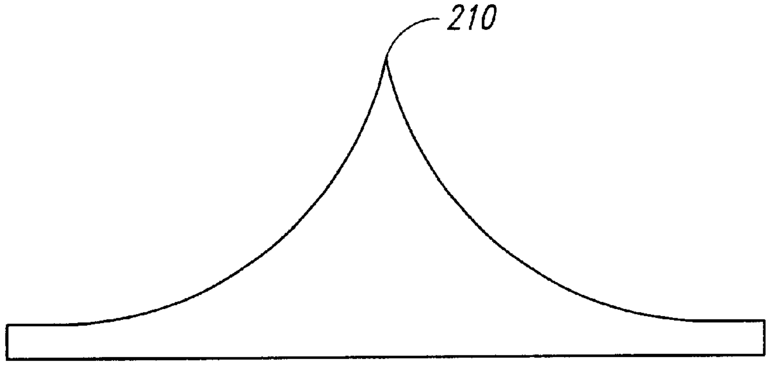
Figure 3A:
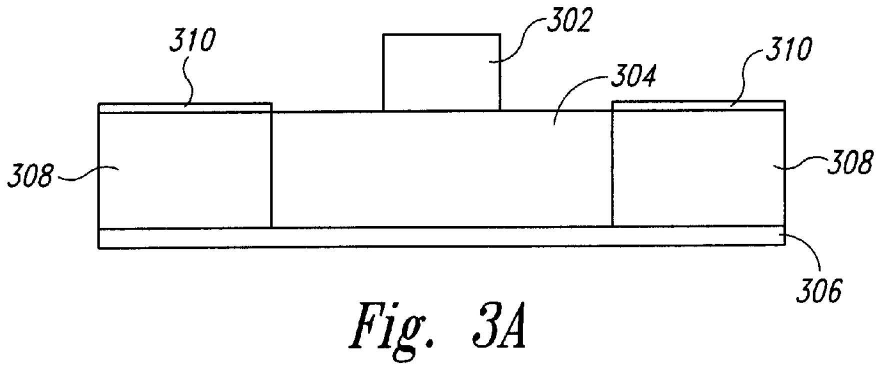
FIGS. 3A–D illustrate fabrication of a sharp silicon-based field emitter tip according to one embodiment of the present invention.

One embodiment of the present invention provides a low-temperature method, compatible with CMOS substrates, for sharpening silicon-based field emitter tips. FIGS. 3A–3D illustrate fabrication of a sharp silicon-based field emitter tip according to one embodiment of the present invention. FIG. 3A illustrates a CMOS substrate that includes a deep polycrystalline or amorphous silicon well masked by a photoresist layer that represents the starting point for fabrication of a silicon-based field emitter tip. The photoresist layer 302 is created on top of the silicon well 304 by well-known photolithographic techniques. The silicon well 304 is itself layered on top of a metallic layer 306 that represents the cathode layer for the silicon-based field emitter tip to be fabricated. The silicon well 304 is surrounded on all sides by a dielectric layer 308. A second metal layer 310 serves, in the completed silicon-based field emitter device, as the electronic extraction anode.

Figure 3B:
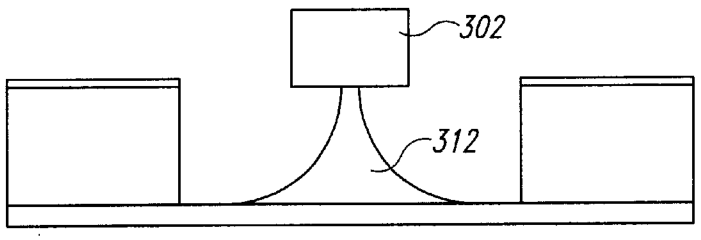

In a first step for creating a silicon-based field emitter tip according to the present invention, one of many well-known isotropic plasma etching techniques is employed to isotropically etch the silicon well 304 to produce a rough silicon-based field emitter tip below the photoresist mask 302. For example, a plasma etch media may be used that employs one of the follow gases or gas mixtures: $Cl_2$, $BCl_3$, $SiCl_4/Cl_2$, $BCl_3/Cl_2$, $HBr/Cl_2/O_2$, $HBr/O_2$, $Br_2/SF_6$, $SF_6$, $CF_4$, $CF_3Br$, or $HBr/NF_3$. FIG. 3B shows the rough silicon-based field emitter tip following fluorine-based plasma etching of the silicon well. Note that a block of photoresist 302 remains above the rough field emitter tip 312.

Figure 3C:
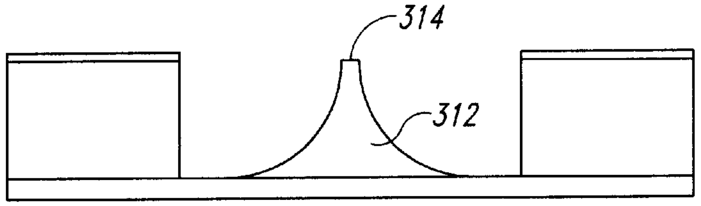

In a second step, the photoresist mask is stripped off by well-known photoresist stripping methods, such as plasma $O_2$ stripping or various types of wet stripping using solvent strippers, sulfonic acid and chlorinated hydrocarbon solvent strippers, or chromic sulfuric acid mixtures. FIG. 3C shows the rough silicon-based field emitter tip following photoresist stripping. Note that the rough silicon-based field emitter tip 312 has a blunt, or mesa-like point 314 following photoresist stripping.

Figure 3D:
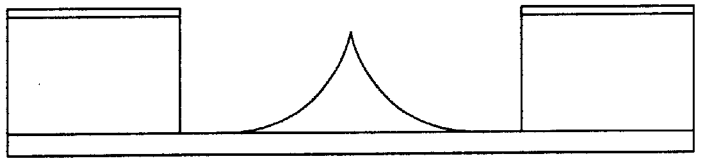

Finally, xenon difluoride, $XeF_2$, isotropic silicon etching is employed to sharpen the rough silicon-based field emitter tip illustrated in FIG. 3C. FIG. 3D illustrates the sharpened silicon-based field emitter tip following $XeF_2$ etching. In one embodiment, $XeF_2$ etching is carried out by sublimating $XeF_2$ crystals and introducing the resulting $XeF_2$ gas into a process chamber. $XeF_2$ etching occurs at room temperature without the need for creating a plasma. $XeF_2$ etching provides extremely conformal isotropic etch profiles and reacts with silicon with high specificity. The reaction of the xenon difluoride with silicon produces volatile and easily removed silicon fluoride compounds. In alternative embodiments, $XeF_2$ gas can be obtained by other well-known methods.

Figure 4:
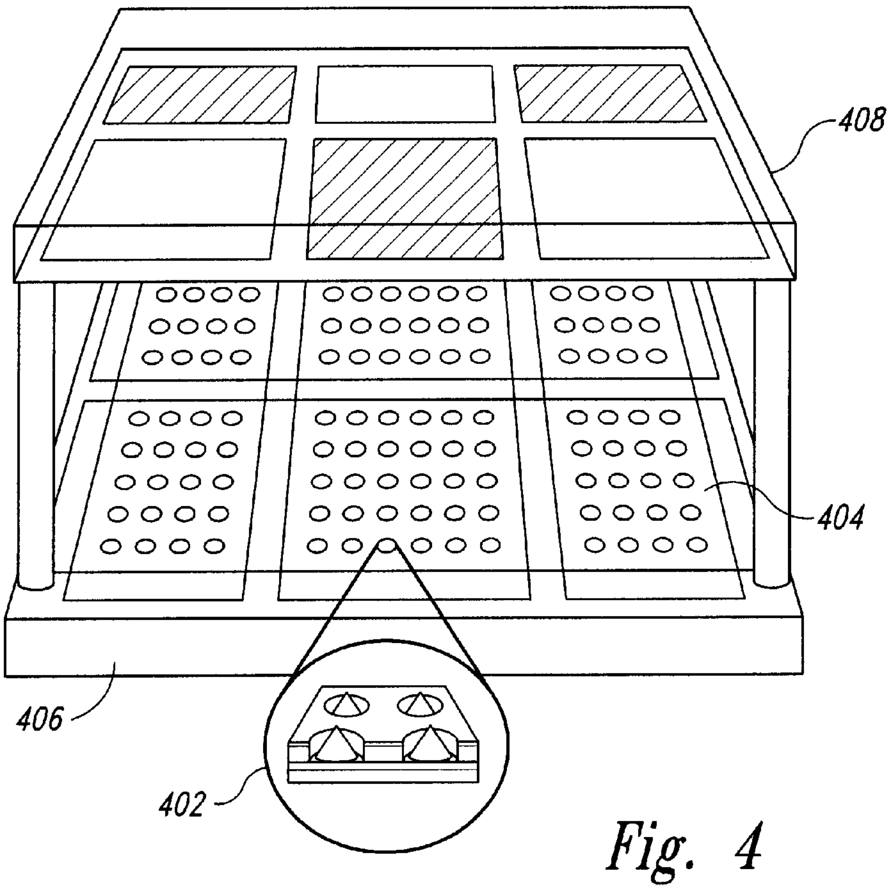
FIG. 4 illustrates a computer display device based on field emitter tip arrays.

Silicon-based field emitter tips can be micromanufactured by microchip fabrication techniques as regular arrays, or grids, of field emitter tips. Uses for arrays of field emitter tips include computer display devices. FIG. 4 illustrates a computer display device based on field emitter tip arrays. Arrays of silicon-based field emitter tips 402 are embedded into emitters 404 arrayed on the surface of a cathode base plate 406 and are controlled, by selective application of voltage, to emit electrons which are accelerated towards a face plate anode 408 coated with chemical phosphors. When the emitted electrons impact onto the phosphor, light is produced. In such applications, the individual silicon-based field emitter tips have tip radii on the order of hundreds of Angstroms and emit currents of approximately 10 nanoamperes per tip under applied electrical field strengths of around 50 Volts. The method of the present invention may be used to prepare arrays of sharpened field emitter tips for use in such display devices.

Figure 5:
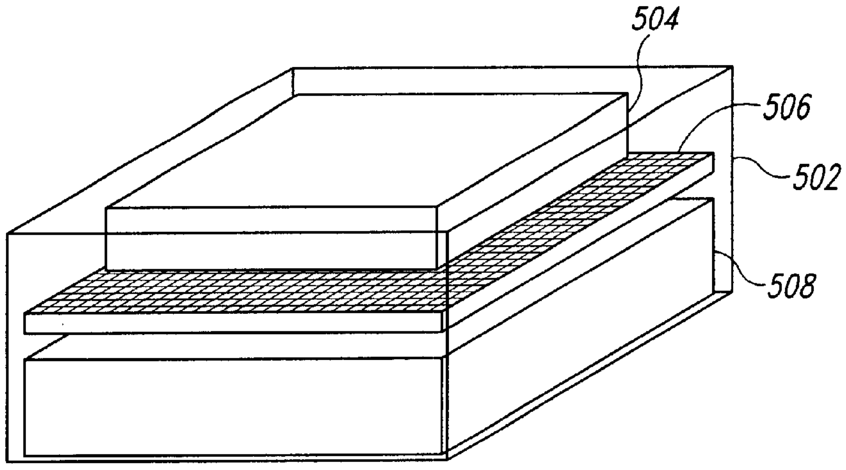
FIG. 5 illustrates an ultra-high density electromechanical memory based on a phase-change storage medium.

Silicon-based field emitter tips are also employed in various types of ultra-high density electronic data storage devices. FIG. 5 illustrates an ultra-high density electromechanical memory based on a phase-change storage medium. The ultra-high density electromechanical memory comprises an air-tight enclosure 502 in which a silicon-based field emitter tip array 504 is mounted, with the field emitter tips vertically oriented in FIG. 5, perpendicular to lower surface (obscured in FIG. 5) of the silicon-based field emitter tip array 504. A phase-change storage medium 506 is positioned below the field emitter tip array, movably mounted to a micromover 508 which is electronically controlled by externally generated signals to precisely position the phase-change storage medium 506 with respect to the field emitter tip array 504. Small, regularly spaced regions of the surface of the phase-change storage medium 506 represent binary bits of memory, with each of two different solid states, or phases, of the phase-change storage medium 506 representing each of two different binary values. A relatively intense electron beam emitted from a field emitter tip can be used to briefly heat the area of the surface of the phase-change storage medium 506 corresponding to a bit to melt the phase-change storage medium underlying the surface. The melted phase-change storage medium may be allowed to cool relatively slowly, by relatively gradually decreasing the intensity of the electron beam to form a crystalline phase, or may be quickly cooled, quenching the melted phase-change storage medium to produce an amorphous phase. The phase of a region of the surface of the phase-change storage medium can be electronically sensed by directing a relatively low intensity electron beam from the field emitter tip onto the region and measuring secondary electron emission or electron backscattering from the region, the degree of secondary electron emission or electron backscattering dependent on the phase of the phase-change storage medium within the region. A partial vacuum is maintained within the airtight enclosure 502 so that gas molecules do not interfere with emitted electron beams. Dense fields of tiny field emitter tips microfabricated according to the present invention are particularly suitable for application in these ultra high-density electronic data storage devices. The method of the present invention may be used to prepare arrays of sharpened field emitter tips for use in such display devices.

Although the present invention has been described in terms of a particular embodiment, it is not intended that the invention be limited to this embodiment. Modifications within the spirit of the invention will be apparent to those skilled in the art. For example, other low-temperature silicon etching gases, besides $XeF_2$, that produce conformal isotropic etch profiles may be employed for the final step of silicon-based field emitter tip sharpening. The silicon well from which the silicon-based field emitter tip is replicated may have various shapes and sizes created by well-known microchip fabrication techniques, depending on the final shape and size of the silicon-based field emitter tip desired. It may be possible to use layers other than photoresist layers to mask a portion of the silicon well prior to the first isotropic etching step. The silicon well may be positioned on top of various different types of metallic and semiconductor substrates, or may be the surface portion of a silicon substrate, and the dielectric and metallic layers may have a variety of different compositions.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

What is claimed is:

1. A method for sharpening a silicon-based field emitter tip, the method comprising:

enclosing the silicon-based field emitter tip within a process chamber;

producing a room-temperature gas that reacts with silicon with high specificity and that produces a conformal isotropic etch profile; and introducing the room-temperature gas into the process chamber to isotropically etch the rough field emitter tip to sharpness.

2. The method of claim 1 wherein the room-temperature gas is xenon difluoride.

3. A method for fabricating a sharp, silicon-based field emitter tip, the method comprising:

microfabricating a silicon well, surrounded laterally by a dielectric layer, above an underlying first metal layer with a second metal layer overlying the dielectric layer leaving a surface area of the silicon well exposed;

isotropically etching silicon within the silicon well to create a rough field emitter tip above the first metal layer; and isotropically etching the rough field emitter tip with a room-temperature gas to produce the final, sharp silicon-based field emitter tip.

4. The method of claim 3 wherein isotropically etching silicon within the silicon well to create a rough field emitter tip above the first metal layer further comprises:

applying a photoresist layer to surface of the second metal layer;

photolithographically patterning a photoresist mask on the exposed surface of the silicon well, roughly centered within the exposed surface of the silicon well, with a surface area less than the surface area of the silicon well;

isotropically etching silicon within the silicon well to create a rough field emitter tip above the first metal layer and below the photoresist mask; and removing the photoresist mask following isotropically etching silicon within the silicon well.

5. The method of claim 3 wherein isotropically etching silicon within the silicon well to create a rough field emitter tip above the first metal layer and below the photoresist mask further includes exposing the photoresist-masked silicon well to a plasma etch medium.

6. The method of claim 3 wherein the plasma etch medium employs a gas or gas mixture selected from various gas or gas mixtures that include:

$Cl_2$;

$BCl_3$;

$SiCl_4/Cl_2$;

$BCl_3/Cl_2$;

$HBr/Cl_2/O_2$;

$HBr/O_2$;

$Br_2/SF_6$;

$SF_6$;

$CF_4$;

$CF_3Br$;

and $HBr/NF_3$.

7. The method of claim 3 wherein the photoresist mask is removed following isotropically etching silicon within the silicon well by plasma $O_2$ stripping.

8. The method of claim 3 wherein the photoresist mask is removed following isotropically etching silicon within the silicon well by exposing the photoresist mask to a stripping solution selected from among stripping solutions including:

a solvent-based stripping solution;

a sulfonic acid and chlorinated hydrocarbon solvent stripping solution; and a chromic acid and sulfuric acid stripping solution.

9. The method of claim 3 applied to array of silicon-based field emitter tips to produce an array of sharp, silicon-based field emitter tips.

10. The method of claim 3 wherein the room-temperature gas is xenon difluoride.

11. A method for preparing an array of sharp, silicon-based field emitter tips for use as a component in an electronic device, the method comprising:

microfabricating an array of silicon wells, each well surrounded laterally by a dielectric layer, above an underlying first metal layer with a second metal layer overlying the dielectric layer leaving a surface area of the silicon well exposed;

isotropically etching silicon within the silicon wells to create an array of rough field emitter tips above the first metal layer;

isotropically etching the rough field emitter tips with a room-temperature gas to produce an array of sharp, silicon-based field emitter tips; and including the array of sharp, silicon-based field emitter tips in the electronic device.

12. The method of claim 10 wherein the room-temperature gas is xenon difluoride.

13. The method of claim 10 wherein the electronic device is a field emission display device.

14. The method of claim 10 wherein the electronic device is an ultra-high-density electronic memory device.

* * * * *